United States Patent
Aimone

(10) Patent No.: US 12,468,185 B2
(45) Date of Patent: Nov. 11, 2025

(54) OPTICAL WAVEGUIDE MODULATOR

(71) Applicant: Nokia Solutions and Networks Oy, Espoo (FI)

(72) Inventor: Alessandro Aimone, Berlin (DE)

(73) Assignee: Nokia Solutions and Networks Oy, Espoo (FI)

( * ) Notice: Subject to any disclaimer, the term of this patent is extended or adjusted under 35 U.S.C. 154(b) by 273 days.

(21) Appl. No.: 18/195,138

(22) Filed: May 9, 2023

(65) Prior Publication Data

US 2024/0377665 A1 Nov. 14, 2024

(51) Int. Cl.
| | |
|---|---|
| G02F 1/035 | (2006.01) |
| G02F 1/025 | (2006.01) |
| G02F 1/225 | (2006.01) |
| G02B 6/12 | (2006.01) |

(52) U.S. Cl.
CPC ............ G02F 1/0356 (2013.01); G02F 1/025 (2013.01); G02F 1/2255 (2013.01); G02B 2006/12142 (2013.01); G02F 2201/127 (2013.01)

(58) Field of Classification Search
CPC ...... G02F 1/0356; G02F 1/025; G02F 1/2255; G02F 1/0316; G02F 1/225; G02F 1/035; G02F 2201/127; G02B 2006/12142
USPC ........................................................ 385/1–3
See application file for complete search history.

(56) References Cited

U.S. PATENT DOCUMENTS

| | | | |
|---|---|---|---|
| 6,310,700 B1 | 10/2001 | Betts | |
| 7,693,355 B2 | 4/2010 | Peyghambarian et al. | |
| 10,247,999 B1 | 4/2019 | Yap et al. | |
| 10,788,689 B1 | 9/2020 | Lentine et al. | |
| 10,989,980 B2 | 4/2021 | Iwatsuka et al. | |
| 2002/0048076 A1* | 4/2002 | Kondo | G02F 1/0356 359/322 |
| 2006/0023288 A1* | 2/2006 | McBrien | G02F 1/0356 359/245 |
| 2010/0232736 A1* | 9/2010 | Ichikawa | G02F 1/0356 385/2 |
| 2019/0324345 A1 | 10/2019 | Vera Villarroel et al. | |
| 2021/0325760 A1* | 10/2021 | Makino | G02F 1/0316 |
| 2021/0373364 A1 | 12/2021 | Zhang et al. | |
| 2022/0308418 A1 | 9/2022 | Kataoka et al. | |

(Continued)

FOREIGN PATENT DOCUMENTS

EP 4080272 B1 10/2024

OTHER PUBLICATIONS

Hong-Jie et al., Design of a novel Y-junction electro-optic modulator based on thin film lithium niobite, DOI : 10. 11972/j. issn. 1001-9014. Mar. 14, 2022.

(Continued)

*Primary Examiner* — Robert Tavlykaev
(74) *Attorney, Agent, or Firm* — Stratford Group Ltd.

(57) ABSTRACT

An electro-optic modulator that is disposed along a surface of a substrate includes an optical waveguide having an optical waveguide core disposed along the surface, and two electrode stacks, each of the stacks extending along a corresponding side of a segment of the optical waveguide core to modulate light therein. Each stack includes two electrode segments vertically stacked over the surface of the substrate; wherein at least a part of the segment of the optical waveguide core along the surface is vertically located between the electrode segments of each electrode stack.

14 Claims, 6 Drawing Sheets

(56) References Cited

U.S. PATENT DOCUMENTS

2022/0317483 A1    10/2022  Chakravarty et al.
2022/0397781 A1*   12/2022  Sugiyama ............ H04B 10/501
2023/0055077 A1     2/2023  Shi et al.
2023/0251511 A1*    8/2023  Kharel .................. G02F 1/025
                                                        385/2
2024/0337871 A1*   10/2024  Liang ................... G02F 1/0316

OTHER PUBLICATIONS

Capacitively-Loaded Thin-Film Lithium Niobate Modulator With Ultra-Flat Frequency Response, IEEE Photonics Technology Letters, vol. 34, Issue: 16, 15, 854-857, Aug. 2022.
Hong-Jie et al., Design of a novel Y-junction electro-optic modulator based on thin film lithium niobite, DOI : 10. 11972/i.issn. 1001-9014. Mar. 14, 2022.

* cited by examiner

OPTICAL WAVEGUIDE MODULATOR

TECHNICAL FIELD

The present invention relates to integrated electro-optical modulators.

BACKGROUND

Data center interconnects and broad-band telecom networks make use of optical communication modules to process the high data rates of internet traffic. Optical transceiver (TRx) capable of high data rates typically use Mach-Zehnder modulators (MZMs) having RF-driven electro-optical phase modulators in each waveguide arm. A thin-film LN (TFLN) modulator combining superior electro-optic properties of LN with silicon photonics (SiP) may be implemented in an opto-electronic chip as a photonic integrated circuit (PIC). Advantageously, SiP can utilize mature CMOS processes to fabricate highly integrated optical circuits on a silicon substrate, allowing SiP chips to be mass produced at relatively low cost. Using thin-film optical materials having a large Pockels effect, such as e.g., thin-film lithium niobate ($LiNbO_3$, "LN"), in the waveguide arms of an MZM enables providing data rates in excess of 100 Giga-bit/second (Gbs) while controlling for power consumption. Still, the physical size of thin-film $LiNbO_3$ modulators, which may be up to several centimeters long, can limit how compact an optical transceiver can be.

SUMMARY

Embodiments described herein relate to optical waveguide modulators utilizing an electro-optic material in waveguide arms thereof.

According to an example embodiment, provided is an apparatus. The apparatus includes an electro-optic modulator with an optical waveguide core located along a surface of a substrate. The electro-optic modulator includes two metallic drive electrodes. Each of the metallic drive electrodes has edge portions extending along a corresponding side of a segment of an optical waveguide core. The edge portions of each of the metallic drive electrodes are vertically stacked over the surface of the substrate and are vertically separated. At least, a part of the segment of the optical waveguide core is vertically located between the edge portions of each of the metallic drive electrodes.

In some embodiments, the two metallic edge portions of each metallic drive electrode are electrically insulated from each other along the segment of the optical waveguide core.

In some embodiments, the two metallic edge portions of each metallic drive electrode are electrically connected by another metallic portion of the same one of the metallic drive electrodes along the segment of the optical waveguide core.

BRIEF DESCRIPTION OF THE DRAWINGS

Embodiments disclosed herein will be described in greater detail with reference to the accompanying drawings which represent preferred embodiments thereof, in which like elements are indicated with like reference numerals, and wherein.

DETAILED DESCRIPTION OF SOME SPECIFIC EMBODIMENTS

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits may be omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Furthermore, the following abbreviations and acronyms may be used in the present document:

"CMOS" Complementary Metal-Oxide-Semiconductor
"Si" Silicon
"MZM" Mach-Zehnder Modulator
"LN" Lithium Niobate
"PIC" Photonic Integrated Circuit
"SOI" Silicon on Insulator
"SiP" Silicon Photonics
"RF" Radio Frequency
"DC" Direct Current
"AC" Alternate Current
"TW" Travelling Wave Note that as used herein, the terms "first", "second" and so forth are not intended to imply sequential ordering, but rather are intended to distinguish one element from another, unless explicitly stated. Similarly, sequential ordering of method steps does not imply a requirement of sequential order of their execution, unless explicitly stated.

The term "substrate" encompasses single and multi-layer structures that are roughly or substantially planar. The term "vertical" refers to a direction generally perpendicular to a surface of the substrate along which relevant integrated circuitry is disposed. The term "horizontal" refers to a direction along the surface of the substrate.

The present disclosure describes examples, see e.g., FIGS. 1-2 and 4-5, of optical waveguide modulators using at least a pair of metallic drive electrodes with vertically-stacked metallic edge portions. In some of the examples, each metallic drive electrode may comprise a layer of electrical insulator or dielectric between the two vertically stacked metallic edge portions of the same electrode. At least a part of the optical waveguide core of an optical waveguide of the optical waveguide modulator is vertically located between the adjacent metallic edge portions of each metallic electrode, e.g., being aligned with some of the electrical insulator or dielectric material located between the metallic edge portions.

Figure 1:
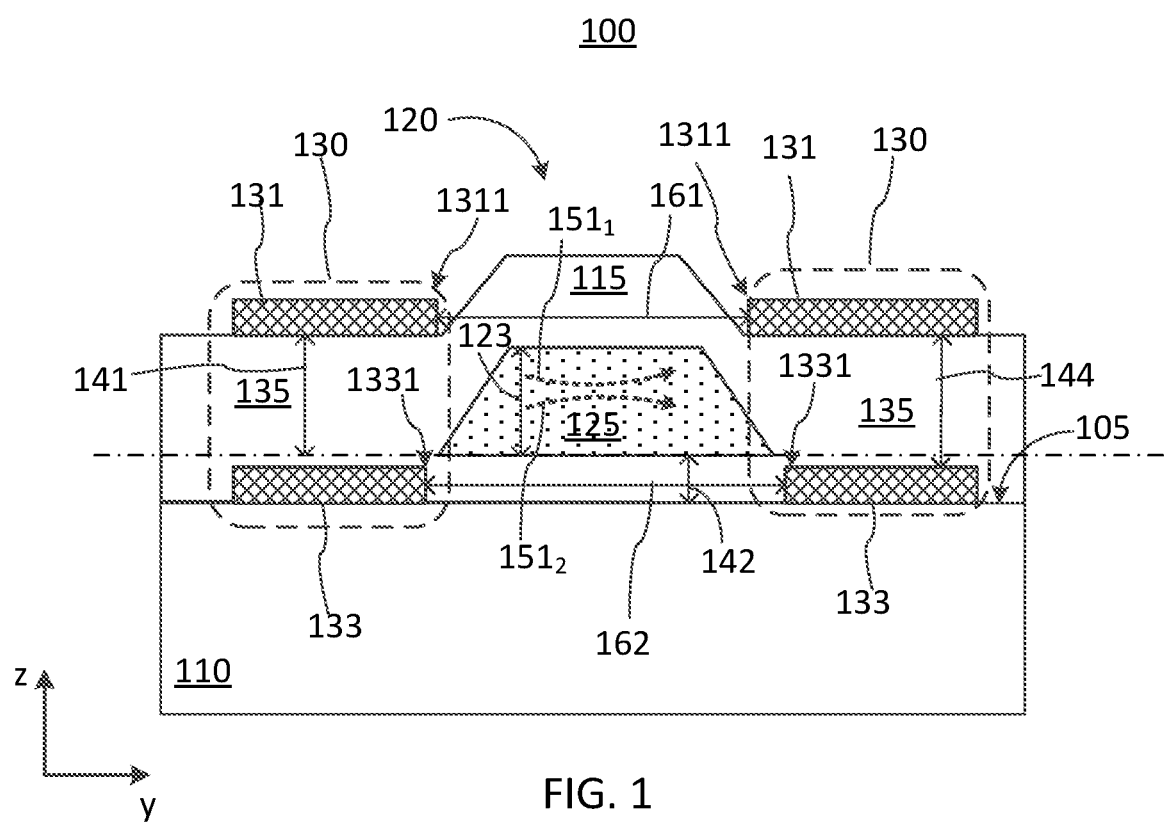
FIG. 1 is a schematic cross-sectional view of an optical phase modulator with vertically stacked electrodes along an optical waveguide.

FIG. 1 schematically illustrates a vertical cross-section of an optical waveguide modulator 100 ("modulator 100") according to an embodiment. The modulator 100 includes an optical waveguide 120 located between two pairs 130 of vertically-stacked metallic electrodes ("electrode stacks 130"). The electrode stacks 130 and the optical waveguide 120 between them extend along a surface of a substrate 110 in a direction perpendicular to the plane of FIG. 1. The substrate 110 may be, for example, a silicon substrate or a silicon-on-insulator (SOI) substrate. The optical waveguide 120 has an optical waveguide core 125, which comprises suitable, typically non-conducting, electro-optic (EO) material exhibiting Pockels effect, such as e.g., lithium niobate (LiNbO3, "LN"). A layer of dielectric material 115 having a smaller refractive index than the material of the optical waveguide core 125 may be optionally provided over the optical waveguide core 125 to form a cladding of the optical waveguide 120. The dielectric material 115 may be, e.g., silicon dioxide (SiO2) as a non-limiting example. The electrode stacks 130 extend along opposing sides of the optical waveguide 120, so as to induce an electric field E in the optical waveguide core 125 responsive to a voltage applied between the electrode stacks 130. In various implementations, one of electrode stacks 130 may be used as a ground electrode and the other as a signal electrode to which an RF modulating signal is applied, or the pair of electrode stacks 130 may be used as differentially driven signal electrodes. Each of the electrode stacks 130 includes two vertically stacked electrodes, a top electrode 131 and a lower ("bottom") electrode 133, with a layer of vertically separating material 135 therebetween. The vertically separating material 135 may be, e.g., silicon dioxide, or another suitable electrical insulator. At least one of the top electrode 131 and the bottom electrode 133 in each pair 130 is located "off-plane" relative to the optical waveguide core 125, i.e., with a vertical offset relative to the optical waveguide core 125. At least a part of the optical waveguide core 125 is vertically between the top electrode 131 and the bottom electrode 133 of each stack 130. In other words, at least a part of the optical waveguide core 125 is vertically located between, i.e., along the z-axis, the electrodes 131, 133. In the example illustrated in FIG. 1, each of the top and bottom electrodes 131, 132 is vertically offset relative to the optical waveguide core 125, the respective offsets being in opposite directions (i.e., away from, and toward, respectively, the substrate 110). The electrodes 131 and 133 may also be referred to as vertically-stacked or as the electrode stack 130.

In a typical configuration the refractive index of the EO material of the optical waveguide core 125 is responsive to a horizontal component $E_y$ of the electrical field (y-axis in FIG. 1), changing approximately linear with the strength thereof. Applying a voltage between e.g., the top electrodes 131 of the electrode stacks 130 induces an electrical field $151_1$ in the optical waveguide core 125. Similarly, applying a voltage between e.g., the lower ("bottom") electrodes 133 of the electrode stacks 130 induces an electrical field $151_2$ in the optical waveguide core 125.

In a typical embodiment where the top and bottom electrodes 131, 133 of each stack 130 are pair-wise electrically connected so that horizontal components of the electrical fields $151_1$ and $151_2$ primarily add constructively in nearby parts of the optical waveguide core 125. That is, each vertically stacked pair of metallic electrodes 131 and 133 forms a single metallic drive electrode, for which the edge portions 1311, 1331 of the electrodes 131 and 133 are sources of strong electric fields for modulating the nearby parts of the optical waveguide core 125, during operation. The edge portions 1311, 1331 of the metallic electrodes 131 and 133 are vertically stacked and separated metallic parts of the corresponding single drive electrode. Applying a voltage between the drive electrodes causes the edge portions to produce electric fields whose horizontal components largely add in the optical waveguide core 125 to provide electro-optical modulation.

For a given voltage applied between the electrode stacks 130, the strength of the horizontal electric field in the optical waveguide core 125 increases if the electrode gaps between the top (1311) edge portions of the two drive electrodes 130 (gap 161) and/or between the bottom (1331) edge portions thereof (gap 161) decrease. Positioning the electrodes 131 and/or 133 with a suitable vertical offset relative the optical waveguide core 125 also provides a vertical offset between the corresponding edge portions 1311 and/or 1331 of the electrodes and a portion of the optical waveguide core 125 where the optical guided mode is mostly confined, thereby allowing for a smaller electrode gap(s) 161 and/or 162 without increasing the optical loss in the optical waveguide 120. Thus, employing drive electrodes 130 with vertically-stacked edge portions 1311, 1331 may allow increasing the strength of the electric field in the optical core 125 and/or reducing the optical loss in the optical core 125 as compared to an optical modulator having a single edge portion on each side of the optical core.

In various embodiments, the vertical gap 144 between the electrodes 131, 133 of each electrode pair 130 may be, e.g., in a range between about half of the thickness 123 of the optical waveguide core 125 to about four times the optical waveguide core thickness 123, or preferably between one and two times the optical waveguide core thickness 123. The values of the horizontal electrode gaps 161 and 162 may be individually adjusted depending, e.g., on the corresponding vertical electrode offsets 141, 142, the vertical gap 144 of each stack, and/or on a size and shape of the optical waveguide core 125. For example, in some embodiments, e.g., where the optical waveguide core 125 is narrower at the top, such as being approximately trapezoidal in cross-section as illustrated in FIG. 1, the top electrode gap 161 may be smaller than the bottom electrode gap 162.

FIG. 1 illustrates an example embodiment wherein the optical waveguide core 125 is an approximately trapezoidal ridge in cross-section; such optical waveguide core shapes may be obtained by, e.g., so-called "deep-etch" processing, wherein a layer of EO material, e.g., thin-film LN, is etched through to form the optical waveguide core 125.

Figure 2:
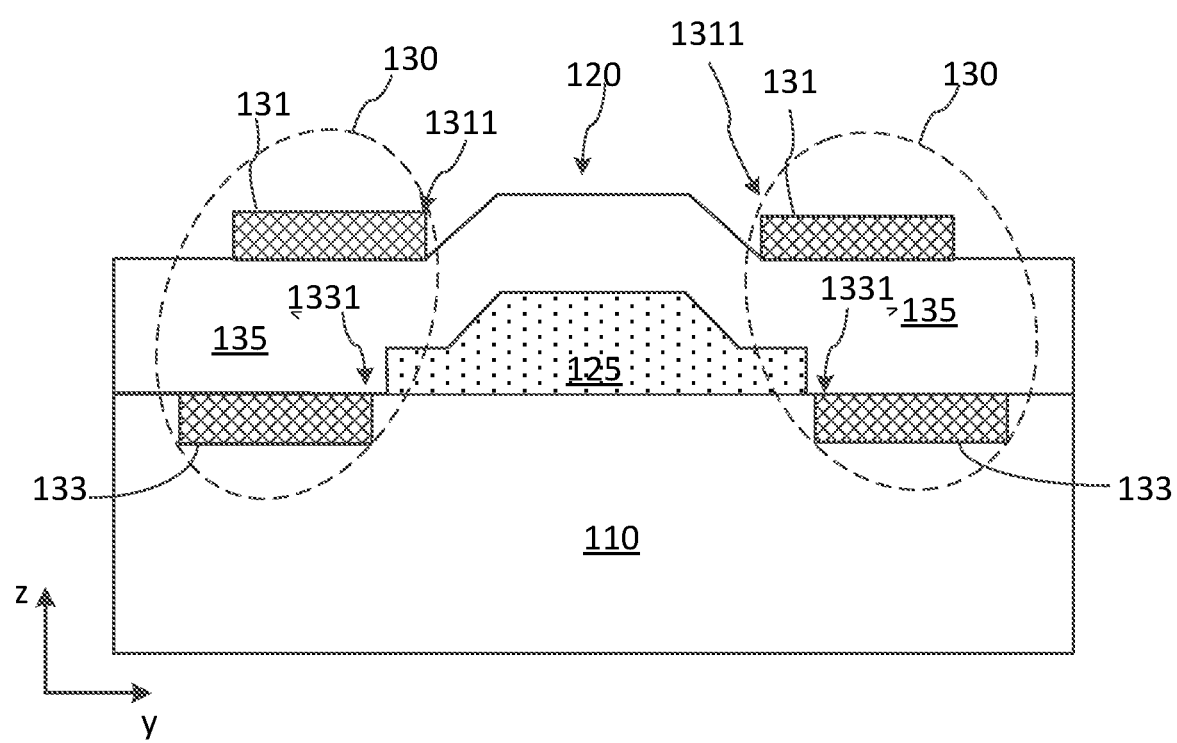
FIG. 2 is a schematic cross-sectional view of an optical phase modulator with vertically stacked electrodes along an optical ridge waveguide.

FIG. 2 schematically illustrates an embodiment of the optical modulator 100 wherein the optical waveguide core 125 has a "shallow-ridge" shape in cross-section, with a "pedestal" at the bottom. Such optical waveguide core shapes may be obtained, e.g., using a "shallow-etch" processing to define a shallow waveguiding ridge on a pedestal of the EO material, e.g., a thin-film LN. In such embodiments, the top electrodes 131 of the electrode stacks 130 may also be horizontally located closer to each other than the bottom electrodes 133. In some of such embodiments, the top electrodes 131 may have portions directly over part of the LN "pedestal" of the waveguide core 125.

Again, in FIG. 2, the pair of metallic electrodes 131 and 133 of each electrode stack 130 forms a single metallic drive electrode. The edge portions 1311, 1331 of the electrodes 131 and 133 of the same vertical stack are vertically stacked and vertically separated metallic edge portions of the same metallic drive electrode.

Figure 3:
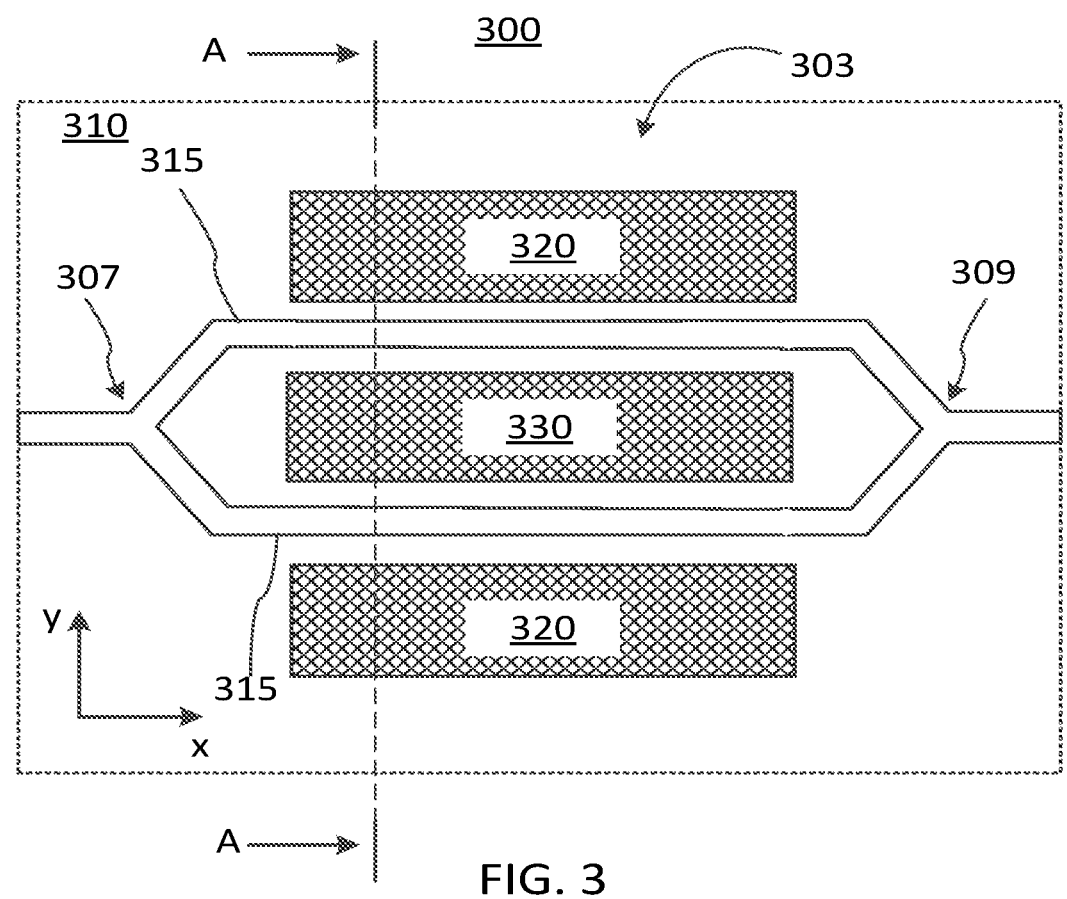
FIG. 3 is a top view of an optical waveguide Mach-Zehnder modulator (MZM) with vertically stacked electrodes.

FIG. 3 schematically illustrates a layout of an example planar optical waveguide Mach-Zehnder modulator (MZM) that may incorporate one or more vertically stacked electrode pairs of the type described above with reference to FIGS. 1 and 2. The planar optical waveguide MZM 300 ("MZM 300") is located along a surface 303 of a substrate 310. The MZM 300 includes two optical waveguide arms 315 ("modulator arms 315"), each of which may be electrically operated as embodiments of the optical waveguide 120 of FIG. 1 or FIG. 2, by electrode stacks 320 and 330. Each of the optical waveguide arms 315 has an optical waveguide core (e.g., 325 in FIG. 4) including an electro-optical material, e.g., lithium niobate (LiNbO3, "LN"), or another suitable electro-optic material which refractive index may be varied by an electrical field, e.g., due to the Pockels effect. The modulator arms 315 are connected to receive light in parallel from an optical splitter 307 and to transmit said light to an optical combiner 309, for recombination, after travelling along the modulator arms 315. In some embodiments, the optical splitter 307 and the optical combiner 309 may be formed with a different material than the modulator arms 315; e.g., the optical splitter 307 and the optical combiner 309 may be formed with silicon waveguides, while the modulator arms 315 may have LN cores. In some embodiments, the optical splitter 307 and the optical combiner 309 may be located in a different layer than the optical waveguide cores of the modulator arms 315, and may be optically coupled to the modulator arms 315 with vertical couplers. The MZM 300 also includes three electrode stacks extending over the surface 303 of the substrate 310 along the modulator arms 315, a middle electrode stack 330 extending between the modulator arms 315, and two outer electrode stacks 320 along respective outer sides of the modulator arms 315. In this layout, each of the modulator arms 315 is located between the middle electrode stack 330 and one of the outer electrode stacks 320. The electrode stacks 320, 330 are configured to modulate light in each of the two optical waveguide arms 315 responsive to an RF voltage applied between the middle electrode stack 330 and a respective one of the two outer electrode stacks 320. In a typical embodiment, at least one of the electrode stacks 320, 330 are configured to operate as TW electrodes ("RF waveguides").

Figure 4:
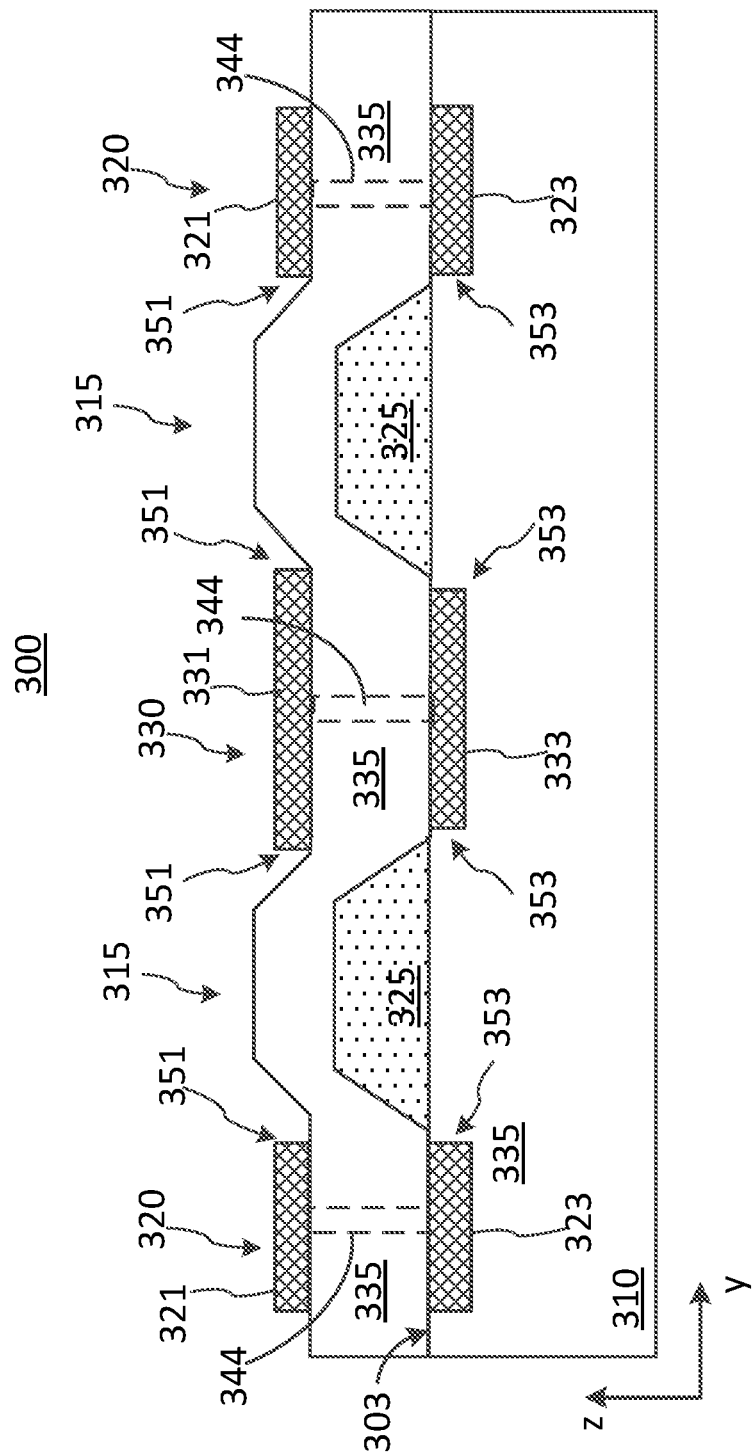
FIG. 4 is a schematic cross-sectional view of the optical waveguide MZM of FIG. 3 according to a first example.

FIG. 4 illustrates a vertical cross-section of the MZM 300 of FIG. 3, e.g., along a line AA in FIG. 3, according to an embodiment. The modulator arms 315 include each an optical waveguide core 325 extending along the surface 303 of the substrate 310 in a direction normal to the plane of the figure and comprising, e.g., suitably oriented ("cut") LN material. Each of the outer electrode stacks 320 includes a pair of vertically stacked electrodes 321 and 323 with a layer of electrically insulator, i.e., a dielectric material 335, vertically therebetween and in contact therewith. The middle electrode stacks 330 also includes a pair of vertically stacked electrodes 331 and 333 and a layer of electrically insulating material 335 between them. Each of the electrode stacks 320, 330 may be an embodiment of the electrode stacks 130 described above, and the optical waveguide cores 325 may be each an embodiment of the optical waveguide core 125 of FIG. 1 or FIG. 2. Each pair of vertically stacked electrodes 321, 323 may also be referred to herein as the electrode stack 320. Similarly, the pair of vertically stacked electrodes 331, 333 may be referred to herein as the electrode stack 330.

The vertically stacked electrodes 321, 323 of each outer electrode stack 320 may be electrically connected on-chip, e.g., with conducting vias 344 in some embodiments. Similarly, the vertically stacked electrodes 331, 333 of the middle electrode stack 330 may also be electrically connected on-chip, e.g., with conducting vias 344. In some embodiments, a plurality of conducting vias 344 may be distributed along each of the electrode stacks 320, 330. The substrate 310 may be, e.g., a silicon substrate or a SOI substrate.

The separation material 335 may be, for example but not exclusively, silicon dioxide (SiO2) or any other suitable electrical insulator. In some embodiments, the material 335 may function as optical cladding of the optical waveguide cores 325. In some embodiments, the material 335 may extend over the optical waveguide cores 325. In some embodiments, the optical waveguide cores 325 may be exposed at the top. In some embodiments, the top outer electrodes 321 may be separated from the top middle electrode 331 by smaller horizontal gap than the electrode gaps separating the lower outer electrodes 323 from the lower middle electrode 333.

When a voltage is applied between one of the outer electrode stacks 320 and the middle electrode stack 330, the horizontal components of fringe electric fields induced between the top electrodes 321 and 331 and between the lower electrodes 323 and 333 are summed in the optical waveguide cores 325, thereby potentially increasing the electric field in the optical waveguide cores and hence the modulation efficiency of the MZM.

Again, in FIG. 4, each of the three electrode stacks 330, 320 forms a single metallic drive electrode, which includes a pair of vertically stacked, and vertically separated metallic edge portions 351, 353 located along a nearby side of one of the optical waveguide cores 325. For each such single metallic drive electrode, the pair of metallic edge portions 351 and 353, i.e., edge portions of the electrodes 321, 323, 331, and 333, are sources of electric fields for modulating light in the optical waveguide core 125, during operation. Employing metallic drive electrodes 330, 320 with vertically-stacked edge portions 351, 353 may allow increasing the strength of the electric field in the optical waveguide cores 325 and/or reducing the optical loss in the optical waveguide cores 325, as compared to an MZM with single-edge electrodes along the optical waveguide arms thereof.

Figure 5:
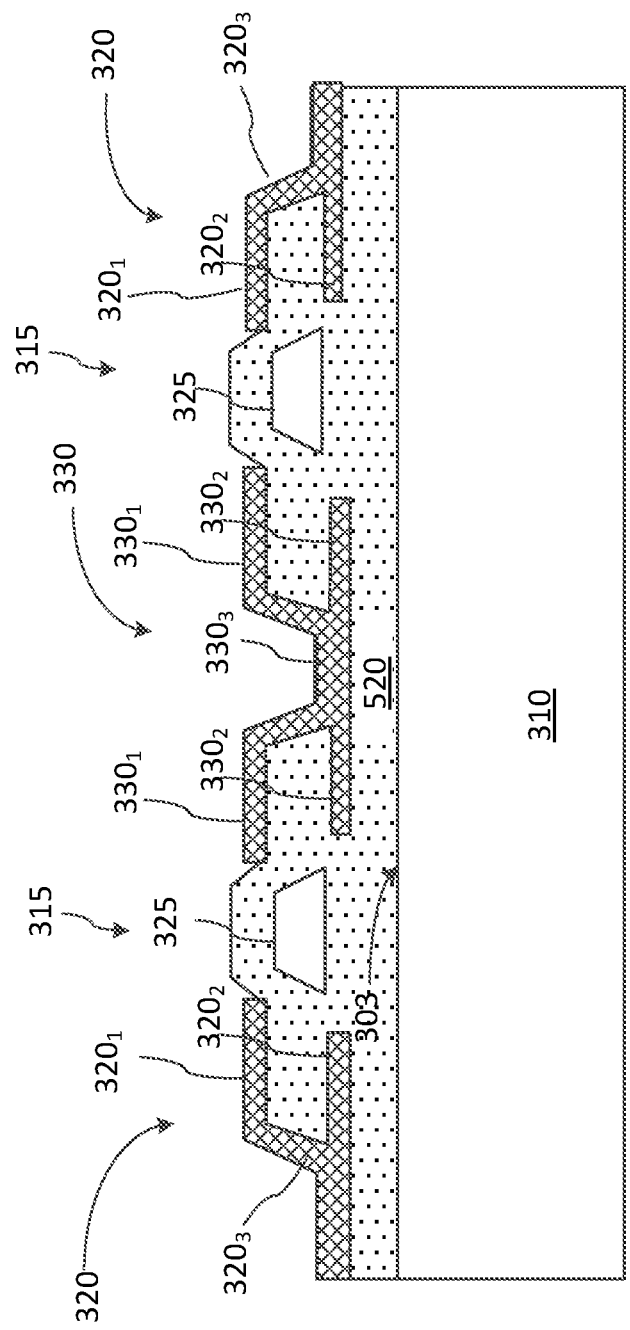
FIG. 5 is a schematic cross-sectional view of the optical waveguide MZM of FIG. 3 according to a second example.

FIG. 5 illustrates a vertical cross-section of the MZM 300 of FIG. 3, e.g., along a line AA in FIG. 3, according to another example configuration. In the example illustrated in FIG. 5, the optical waveguide cores 325 of the optical waveguide arms 315 are surrounded by a cladding layer 520 having a smaller refractive index that the material of the optical waveguide cores 325. The cladding layer 520 may be, e.g., a layer of silicon dioxide (SiO2) disposed over a silicon substrate 310. In other configurations, the optical waveguide cores 325 may be exposed at the top. Further in the illustrated example, each of the outer metallic drive electrodes 320 includes two vertically stacked and vertically separated metallic edge portions $320_1$ and $320_2$ adjacent the nearest optical waveguide core 325. The two vertically stacked metallic edge portions $320_1$ and $320_2$ are separated by an electrically insulating, cladding material near the optical waveguide cores 325, but vertically stacked, metallic edge portions and connected by another metallic portion $320_3$ of the same drive electrode along the sides of metallic edge portions that are distal to the respective optical waveguide cores 325. These other metallic portions $320_3$ of a drive electrode 320 may electrically connect the vertically stacked, metallic edge portions $320_1$ and $320_2$ continuously or intermittently along a substantial length of the nearby optical waveguide cores 325. The middle metallic drive electrode 330 includes two pairs of metallic edge portions $330_1$ and $330_2$. In each pair, the metallic edge portions $330_1$ and $330_2$ are vertically stacked and vertically separated and extend along a nearby one of the two optical waveguide cores 325. The middle metallic drive electrode 330 also includes a metallic central portion $330_3$, located away from the respective optical waveguide cores 325. The metallic central portion $330_3$ provides a continuous or intermittent electrical connection between the vertically stacked, metallic edge portions of the middle metallic drive electrode 330 along a length of the optical waveguide cores 325. The vertically stacked, metallic portions $320_1$, $320_2$ and $330_1$, $330_2$ of the outer and middle metallic drive electrodes 320, 330 are vertically offset from the optical waveguide cores 325 and may be located fairly close to the optical waveguide cores 325 in the plane of the substrate 310 without causing excessive optical loss in the optical waveguide cores 325 of the modulator arms 315. When a voltage is applied between one of the outer metallic drive electrodes 320 and the middle metallic drive electrodes 330, the horizontal components of the electric fields induced by the top metallic edge portions $320_1$ and $330_1$ and the lower metallic edge portions $320_2$ and $330_2$ largely add constructively in the optical waveguide cores 325.

In the example electrode configurations illustrated in FIGS. 1, 2, 4, and 5, the lower metallic edge portions of the respective metallic drive electrodes are shown vertically offset from the corresponding optical waveguide cores, i.e., being closer to the surface of the respective substrate along which the electrode stacks are located. This is, however, not a requirement, and the corresponding example configuration may be modified, e.g., to have the lower edge portions of the drive electrodes aligned with the respective optical waveguide cores along the corresponding metallic drive electrodes. An example of such a metallic drive electrode configuration is illustrated in FIG. 6, which shows a cross-section of the optical waveguide modulator 100 of FIG. 1, which is modified to have the lower metallic edge portions 133 of the metallic drive electrodes 130 aligned at the bottom with the optical waveguide core 125 of the optical waveguide 120.

Figure 6:
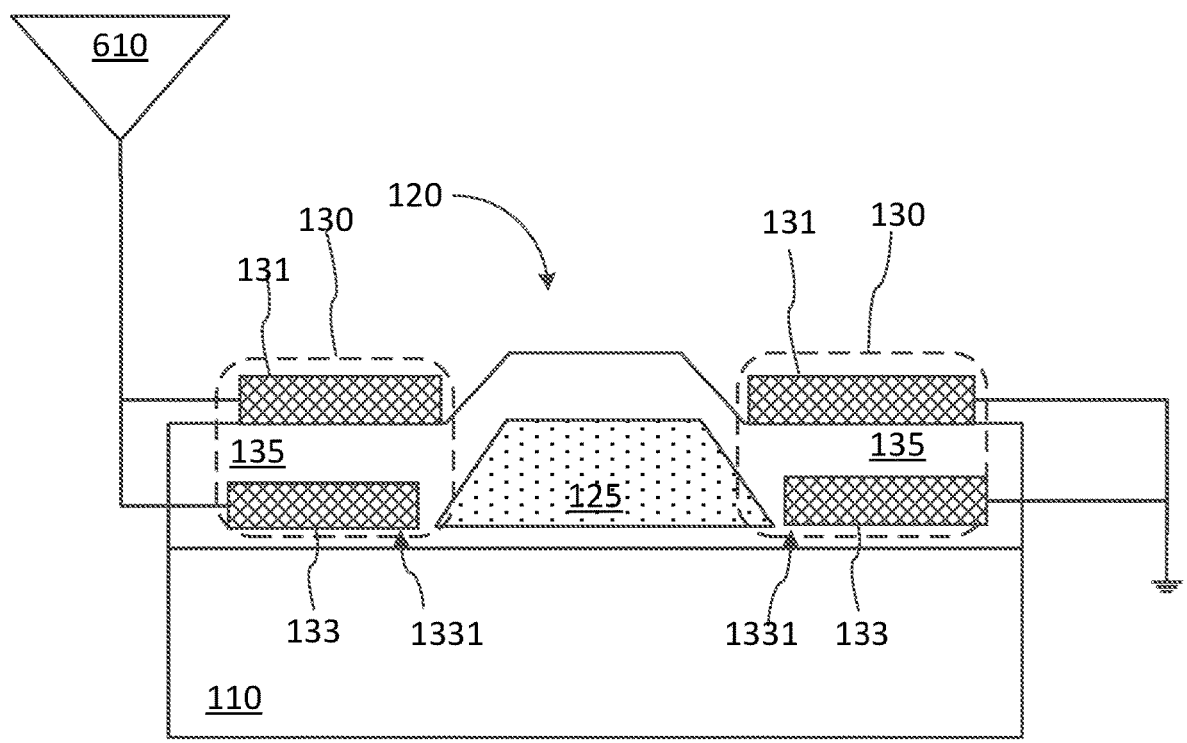
FIG. 6 is a schematic cross-sectional view of an optical phase modulator with core-aligned lower electrodes of vertical electrode stacks.

FIG. 6 further schematically illustrates an example driving scheme of the optical modulator, with an electrical driver 610 connected to provide a same RF drive signal to both of the vertically stacked, metallic edge portions of one of the metallic drive electrodes 130 and with the vertically stacked, metallic edge portions of the other metallic drive electrode connected to ground. In another example, the electrical driver 610 may be a differential driver providing a first single-ended RF signal to the metallic edge portions of one of the drive electrodes 130, and providing a complementary, i.e., voltage-inverted, single-ended RF signal to the other of the metallic drive electrodes 130.

Herein, in various embodiments of FIGS. 3-5, the metallic drive electrodes of the Mach-Zehnder optical modulators may be electrically driven with methods and structures described in another U.S. patent application, titled "DIFFERENTIAL OPTICAL WAVEGUIDE MODULATOR", by Alessandro Aimone et al (NC327646-US-NP), which is being filed on the same day as the present U.S. patent application. This other U.S. patent application, which is mentioned in this paragraph, is incorporated herein, by reference, in its entirety.

Potential advantages of the electrode configurations described herein for optical waveguide modulators using optical waveguides with electro-optic material in the optical waveguide cores thereof include, apart from possibly reducing the electrode gaps, may include the ability to adjust several design parameters of the electrodes, such as the two horizontal electrode gaps (e.g., 161 and 162 in FIG. 1), and the vertical offset (e.g., 144, FIG. 1) between the two electrodes of the stack. In high-frequency modulator embodiments where the electrode stacks are to operate as RF transmission lines, the ability to adjust these design parameters may help achieving impedance and velocity match, as these parameters impact the capacitive load of the transmission line. Furthermore, having off-plane electrodes may relax some fabrication process constrains, e.g. the optical lithography alignment tolerance.

According to an example embodiment disclosed above, e.g., in the summary section and/or in reference to any one or any combination of some or all of FIGS. 1-6, provided is an apparatus comprising an electro-optic modulator (e.g., 100, FIG. 1; 300, FIGS. 3-5) disposed along a surface (e.g., 105 FIG. 1; 303, FIGS. 3-5) of a substrate (e.g., 110, FIGS. 1, 2, 6; 310, FIGS. 3-5) and comprising: an optical waveguide (e.g., 120, FIGS. 1, 2, 6; 315, FIGS. 3-5) having an optical waveguide core (e.g., 125, FIGS. 1,2,6; 325, FIGS. 4,5) disposed along the surface; and two metallic drive electrodes (e.g., 130, FIGS. 1,2,6; 320 and 330, FIGS. 3-5), each of the metallic drive electrodes having edge portions (e.g., 1311, 1331, FIGS. 1, 2, 6; 351, 353, FIG. 4; 3201, 3202, 3301, 3302, FIG. 5) extending along a corresponding side of a segment of the optical waveguide core, the edge portions of each of the metallic drive electrodes being vertically stacked over the surface of the substrate and being vertically separated; wherein at least a part of the segment of the optical waveguide core along the surface is vertically located between the edge portions of each of the drive electrode structures.

In some embodiments of the above apparatus, the optical waveguide core (e.g., 125, FIGS. 1,2,6; 325, FIGS. 4,5) comprises electro-optic material. In some embodiments of the above apparatus, the electro-optic material is lithium niobate.

In some embodiments, any of the above apparatus may further comprise dielectric (e.g. 135, FIGS. 1, 2, 6; 335, FIGS. 4, 5) between the edge portions (e.g., 1311, 1331, FIGS. 1, 2, 6; 3201, 3301, FIG. 4; 3201, 3202, 3301, 3302, FIG. 5) of each of the metallic drive electrodes.

In some embodiments of any of the above apparatus, along the segment of the optical waveguide core each of the metallic drive electrodes is formed by two vertically separated metallic layers (e.g., 131 and 133, FIGS. 1, 2, 6; 321 and 331, FIG. 4).

In some embodiments of any of the above apparatus, each of the metallic drive electrodes includes a third metallic portion (e.g., 344, FIG. 4; $320_3$, FIG. 5) physically connecting the vertically separated edge portions along the segment of the optical waveguide core.

In some embodiments of any of the above apparatus, one of the edge portions (e.g., 1331, FIG. 1; 353, FIG. 4; $320_2$, $330_2$, FIG. 5) of each of the metallic drive electrodes is closer to the surface of the substrate than the optical waveguide core (e.g., 125, FIGS. 1,2,6; 325, FIGS. 4,5). In some other embodiments of any of the above apparatus, one of the edge portions (e.g., 1331, FIG. 6) of each of the metallic drive electrodes (e.g., 130, FIG. 6) and the optical waveguide core (e.g., 125, FIG. 6) are at a same distance from the surface of the substrate (e.g., 110, FIG. 6).

In some embodiments of any of the above apparatus, two of the edge portions (e.g., 1311, FIGS. 1 and 2; $320_1$ and 330₁, FIG. 5) of the metallic drive electrodes are closer to each other than the other two of the edge portions (e.g., 1331, FIGS. 1 and 2; 320₂ and 330₂, FIG. 5) of the metallic drive electrodes.

In some embodiments of any of the above apparatus, the metallic drive electrodes are configured to electro-optically modulate light propagating in the optical waveguide responsive to a modulating voltage being applied between the metallic drive electrodes.

In some embodiments of any of the above apparatus, the planar electro-optic modulator is a Mach-Zehnder modulator (e.g., 300, FIGS. 3-5) comprising two optical waveguide arms (e.g., 315, FIGS. 3-5) connected to receive light in parallel from an optical splitter (e.g., 307, FIG. 3), wherein one of the two optical waveguide arms (e.g., left-most 315 in FIGS. 3-5) comprises the optical waveguide (e.g., 120, FIGS. 1, 2, 6). In some of such embodiments, the Mach-Zehnder modulator further comprises a third metallic drive electrode (e.g., right-most 320, FIGS. 3-5) extending along a segment of an optical waveguide core of the other of the two optical waveguide arms (e.g., right-most 315 in FIGS. 3-5), the third metallic drive electrode having metallic edge portions (e.g., 351, 353, FIG. 4; 320₁, 320₂, FIG. 5) vertically stacked over the surface of the substrate, the Mache-Zehnder modulator further comprising dielectric (e.g., 335, FIG. 4; 520, FIG. 5) between the metallic edge portions of the third metallic drive electrode. The third metallic drive electrode and one of the other metallic drive electrodes may be configured to modulate light propagating in the other of the two optical waveguide arms responsive to a voltage applied therebetween.

Some embodiments of any of the above apparatus may further comprise an electrical driver (e.g., 610, FIG. 6) connected to provide a same electrical drive signal to each of the two metallic drive electrodes (e.g., 130, FIG. 6).

The examples of electro-optical waveguide modulators and electrode configurations thereof described above are not intended to be limiting, and many variations will become apparent to a skilled reader having the benefit of the present disclosure. For example, the middle electrode stacks 330 of the MZM 300 may be split along the length thereof into two separate electrode stacks, which in some embodiments may be separated by a ground electrode in-between. In another example, embodiments may be envisioned where one or both of the horizontal electrode gaps (e.g., 161 and/or 162, FIG. 1) are smaller than the width of the waveguide core (e.g., 125, FIG. 1).

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims. Various features described above with reference to a specific embodiment or embodiments may be combined with other embodiments.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Furthermore, in the description above, for purposes of explanation and not limitation, specific details are set forth such as particular architectures, interfaces, techniques, etc. in order to provide a thorough understanding of the present invention. In some instances, detailed descriptions of well-known devices, circuits, and methods are omitted so as not to obscure the description of the present invention with unnecessary detail. Thus, for example, it will be appreciated by those skilled in the art that block diagrams herein can represent conceptual views of illustrative circuitry embodying the principles of the technology. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, while the present invention has been particularly shown and described with reference to example embodiments as illustrated in the drawing, it will be understood by one skilled in the art that various changes in detail may be affected therein without departing from the spirit and scope of the invention as defined by the claims.

I claim:

1. An apparatus comprising:
   an electro-optic modulator disposed along a surface of a substrate and comprising:
   an optical waveguide having an optical waveguide core disposed along the surface; and
   two metallic drive electrodes, each of the metallic drive electrodes having edge portions extending along, and protruding towards, a corresponding side of a segment of the optical waveguide core, the edge portions of each of the metallic drive electrodes being vertically stacked over the surface of the substrate and being vertically separated such that a vertical projection of a lower edge portion overlaps with an upper edge portion;
   wherein at least a part of the segment of the optical waveguide core along the surface overlaps with a straight line connecting the lower and upper edge portions of each of the metallic drive electrodes; and
   wherein at least one of the two metallic drive electrodes is configured to be driven by a radio-frequency (RF) drive signal.

2. The apparatus of claim 1 wherein the optical waveguide core comprises electro-optic material.

3. The apparatus of claim 2 wherein the electro-optic material is lithium niobate.

4. The apparatus of claim 1, further comprising dielectric between the edge portions of each of the metallic drive electrodes.

5. The apparatus of any one of claim 1 wherein along the segment of the optical waveguide core each of the metallic drive electrodes is formed by two vertically separated metallic layers.

6. The apparatus of claim 1 wherein each of the metallic drive electrodes includes a third metallic portion physically connecting the vertically separated edge portions along the segment of the optical waveguide core.

7. The apparatus of claim 1 wherein one of the edge portions of each of the metallic drive electrodes is closer to the surface of the substrate than the optical waveguide core.

8. The apparatus of claim 1 wherein one of the edge portions of each of the metallic drive electrodes and the optical waveguide core are at a same distance from the surface of the substrate.

9. The apparatus of claim 1 wherein two of the edge portions of the metallic drive electrodes are closer to each other than the other two of the edge portions of the metallic drive electrodes.

10. The apparatus of claim 1 wherein the metallic drive electrodes are configured to electro-optically modulate light propagating in the optical waveguide responsive to a modulating voltage being applied between the metallic drive electrodes.

11. The apparatus of claim 1 wherein the electro-optic modulator is a Mach-Zehnder modulator comprising two optical waveguide arms connected to receive light in parallel from an optical splitter, wherein one of the two optical waveguide arms comprises the optical waveguide.

12. The apparatus of claim 11 wherein the Mach-Zehnder modulator further comprises a third metallic drive electrode extending along a segment of an optical waveguide core of the other of the two optical waveguide arms, the third metallic drive electrode having metallic edge portions vertically stacked over the surface of the substrate, the Mach-Zehnder modulator further comprising dielectric between the metallic edge portions of the third metallic drive electrode.

13. The apparatus of claim 12 wherein the third metallic drive electrode and one of the other metallic drive electrodes are configured to modulate light propagating in the other of the two optical waveguide arms responsive to a voltage applied therebetween.

14. The apparatus of claim 1 further comprising an electrical driver connected to provide an RF signal to each of the two metallic drive electrodes.

* * * * *